Nov. 28, 1939. M. LEICHSENRING, JR 2,181,700
CONTROL MEANS FOR DRIVING AND DRIVEN ELEMENTS
Filed July 26, 1932 2 Sheets-Sheet 1
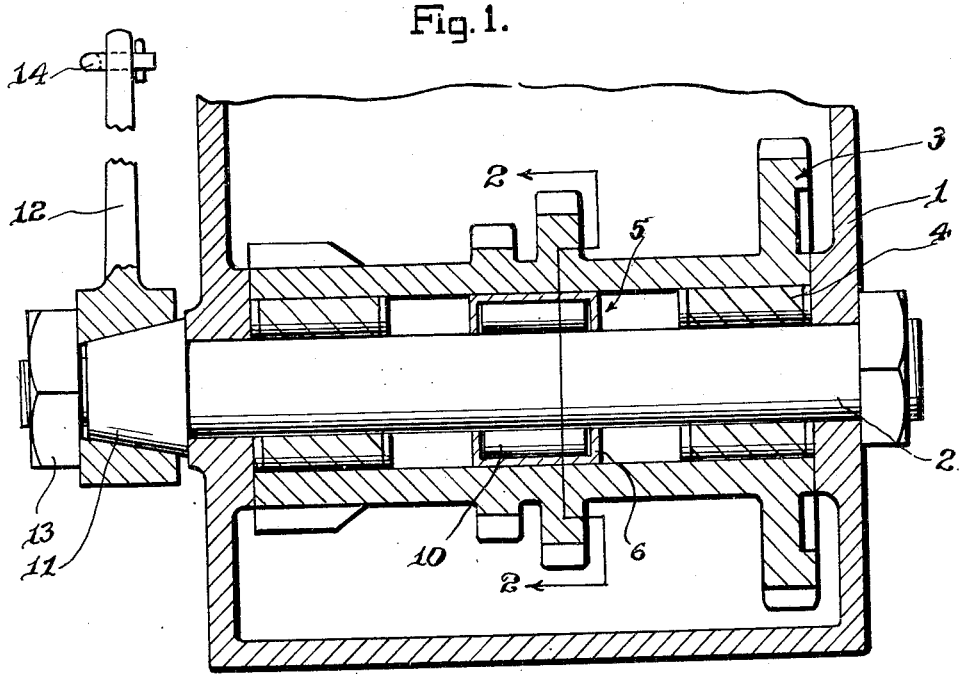
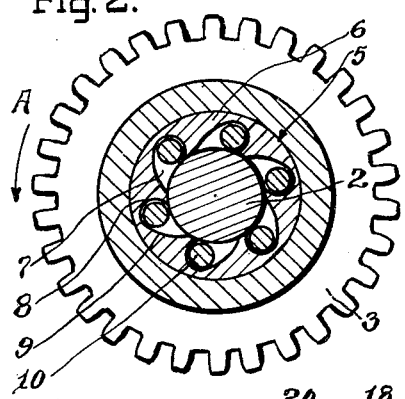
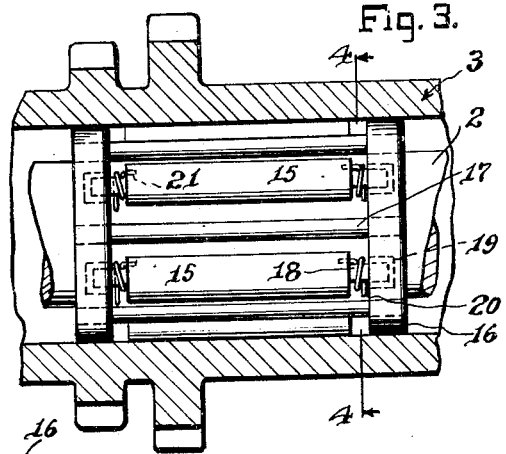
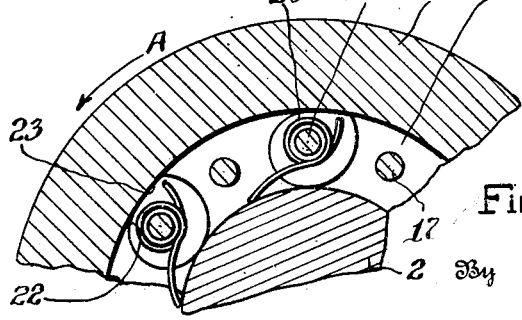
Inventor
Max Leichsenring, Jr.
By J. Kaplan
Attorney Nov. 28, 1939.  M. LEICHSENRING, JR  2,181,700
CONTROL MEANS FOR DRIVING AND DRIVEN ELEMENTS
Filed July 26, 1932  2 Sheets-Sheet 2
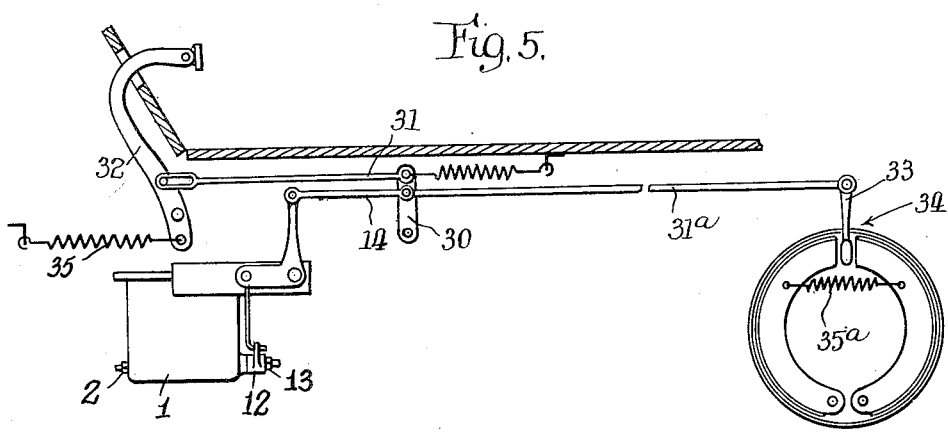
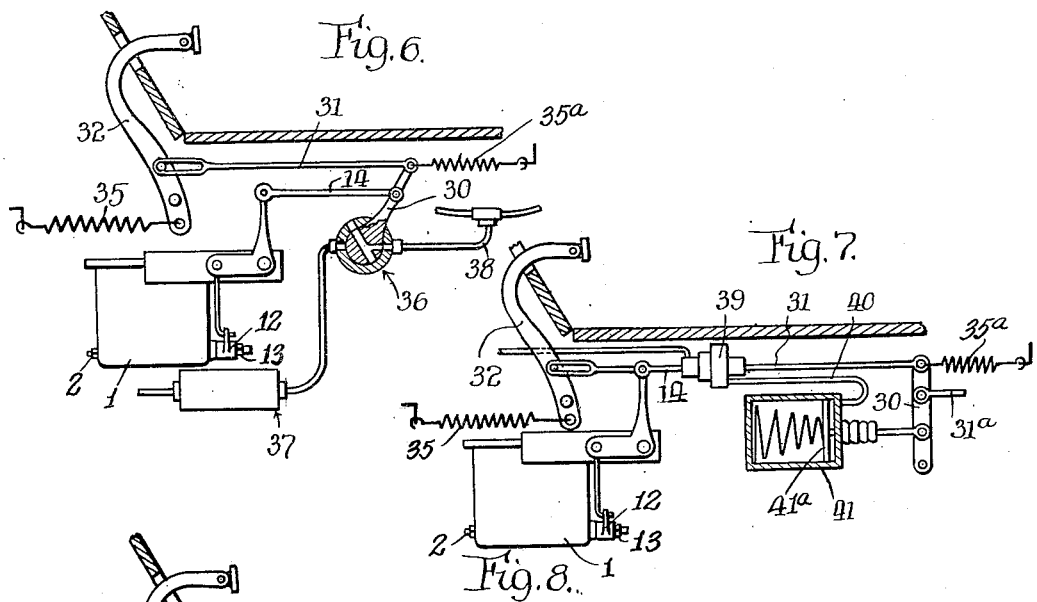
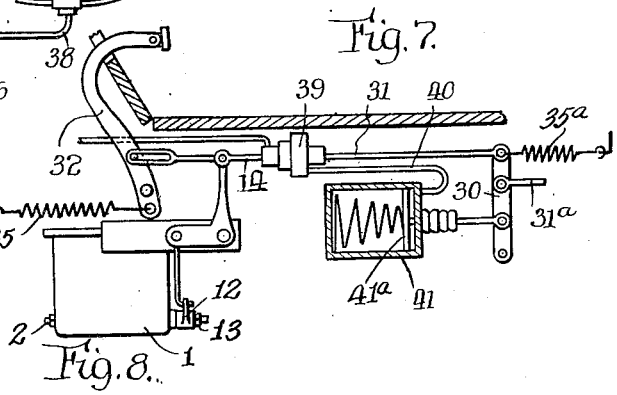
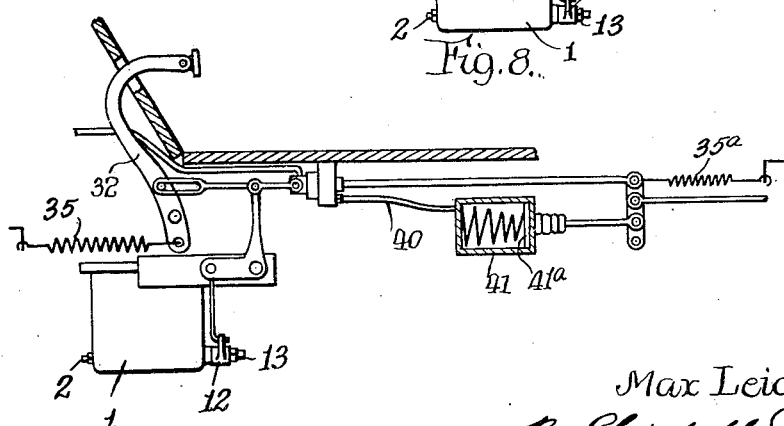
Inventor:
Max Leichsenring, Jr.

Patented Nov. 28, 1939

2,181,700

UNITED STATES PATENT OFFICE 2,181,700

CONTROL MEANS FOR DRIVING AND DRIVEN ELEMENTS

Max Leichsenring, Jr., Chicago, Ill.

Application July 26, 1932, Serial No. 624,807

22 Claims. (Cl. 192—4)

This invention relates to power transmission systems, and more particularly to transmission mechanisms designed for use on automobiles.

In the operation of an automobile as heretofore designed, when it is desired to start the same on a hill it has been found necessary to keep the brake engaged until ready to operate the clutch. Should there be any interval between the release of the brake and the throwing in of the clutch, the car under the action of gravity will start rolling backwards. It has been found in actual practice that such rearward movement will take place unless the friction of the clutch at the time the brakes are released below the point necessary to hold the car, is sufficient to compensate for the reduced braking friction. To accomplish this is very difficult in practice, and particularly so for those who have had little experience in driving automobiles.

A further common difficulty encountered in the driving of an automobile up an incline is that when going up such an incline changing gears is often postponed until the car has nearly come to a stop and then in the interval of changing gears the car loses what little forward momentum it may have and starts rolling backwards.

There have been a number of proposals in the past, to provide devices capable of preventing such retrograde movement, but such devices have not proved satisfactory for various reasons. The objections to devices of this type in the past have been that they were instantaneous in their operation, thereby throwing a terrific strain not only on the device, but also on the other parts of the transmission.

Another difficulty which has rendered most of these attempts to solve the problem inoperative, has been their failure to incorporate practical means for controling the retrograde movement device irrespective of the position of the transmission. Some devices of this character might have operated when the gear set is set in forward gear, but this arrangement has the disadvantage that some means must be provided for moving the device into an inoperative position whenever it is desired to move the car in reverse, thereby adding an additional operation to the reversing of the car. In other devices of this character the arrangement is such that the car may be driven either forward or backward in the usual way and cannot under the action of gravity move in the opposite direction so long as the gears are in mesh, but in neutral the car is still able to move in either direction and frequently in high speed when the clutch and propeller shafts are directly connected and the counter shaft and change speed and reverse gears are disconnected from the clutch shaft. As a consequence, none of these prior devices proved commercially practical.

A further disadvantage is that in the various devices which have been proposed for preventing retrograde movement, reliance was placed upon the device for holding the load of the car, which load will so lock the device as to make it practically impossible to shift gears when it is desired to move in a direction opposite to that for which the car is set to move. In order to permit such movement it is necessary to first move the car a slight distance in the direction for which it is set to move, which movement will release the locking mechanism sufficiently to permit the shifting of gears. This however, is not always possible as some object or parked vehicle may be directly in front of the car, thereby preventing such forward movement until such time as the said object has been removed.

A device for preventing retrograde movement, to be commercially practical must be flexible in its operation, that is, avoid any sudden shock or jolt to the device itself or to the transmission with which it is connected, and therefore must be capable of absorption and dissipation of the energy of the rearwardly moving car rather than absorption and storage of such energy. The apparatus should be relatively simple and should be capable of operation in all positions of the transmission, and further, some means must be provided for releasing the load from the device when it is desired to move the car in a direction opposite to that for which it is set to move.

My present invention is a distinct departure from the prior art proposals in that it avoids sudden stoppage by substituting for an instantaneously acting check, one which will operate more gradually, and by being non-automatic in its operation thus being under the direct control of the operator at all times.

It is therefore among the objects of my invention to provide an improved mechanism for preventing retrograde movement incorporated in the transmission of a vehicle, which mechanism will be effective at the will of the operator for bringing the usual brake mechanism of the vehicle into operative position for inhibiting retrograde movement, whereby the vehicle will be brought to a stop gradually and only upon the actuation of the brake mechanism by the operator, said device, however, being effective when once brought into operative position to hold the vehicle in locked position without any further attention by the operator.

A further object of this invention is to provide a mechanism of the above mentioned type for preventing retrograde movement, said mechanism being connected to the usual brake operating mechanism of the vehicle in such manner as to be unable to check previously acquired movement, but which will be sufficient to hold the car on any ordinary incline once the car has been brought to a stop.

A further object of this invention is to provide a mechanism of the above mentioned type, which will be under the complete control of the operator for permitting or preventing retrograde movement, said control being through the usual brake operating mechanism of the car.

A further object of this invention is to provide a device of the above mentioned type, by means of which retrograde movement may be permitted or prevented, depending on the will of the operator and which will be automatically released from its operative position by the mere movement of the car in the direction for which it is set to move.

A further object of this invention is to provide a device of the above mentioned type incorporated in the transmission of an automobile for preventing retrograde movement, the device being non-automatic in its operation, but which when once actuated and brought into operative position will be effective for inhibiting retrograde movement of the vehicle.

A further object of this invention is to provide a mechanism of the above mentioned type for preventing retrograde movement and adjustable means connecting said mechanism with the usual brake operating mechanism of the car, whereby the same may be adjusted to be either automatic or non-automatic in its operation.

A further object of this invention is to provide a mechanism of the above mentioned type for preventing retrograde movement and yieldingly connecting said mechanism with the usual brake operating mechanism of the vehicle, whereby the braking of the car will be accomplished through the brake operating mechanism and not through the retrograde mechanism.

A further object of this invention is to provide a mechanism of the above mentioned type, which may be frictionally and yieldingly connected with the usual brake mechanism for maintaining said mechanism in brake applying position, said frictional connection being adjustable whereby the mechanism may be made either automatic or non-automatic in its operation and in either case said mechanism being capable of automatically releasing said brake mechanism upon movement of the car in the direction for which it is set to move.

A further object of this invention is to provide a mechanism of the above mentioned type for preventing retrograde movement, which mechanism is capable of both automatic and non-automatic operation, but which is automatic in its release.

A further object of this invention is to provide in association with the transmission of an automobile a mechanism of the above mentioned type for preventing retrograde movement, said mechanism being frictionally and yieldingly connected with the usual brake operating mechanism whereby the actuation of the latter will bring the former into operating position, in which position it will be self-retained until such time as the vehicle is moved in the direction for which it is set to move, which movement will automatically release the same.

A further object of this invention is to provide in an automobile of the character described having the usual brake mechanism, of means associated with said brake mechanism for automatically releasing the same upon movement of the vehicle in the direction for which it is set to move.

A further object of this invention is to provide in a vehicle having the usual brake operating mechanism, means frictionally and yieldingly connected with said brake mechanism effective for automatically releasing the same upon movement of the vehicle in the direction for which it is set to move.

A further object of this invention is to provide a mechanism of the above mentioned type capable of preventing retrograde movement, the said mechanism being normally inoperative, but is adapted to be brought into operative position upon the actuation of the usual brake operating mechanism, and to be self-retained in said operative position until released by the operator or until automatically released by the movement of the car in the direction for which it is set to move.

A further object of this invention is to provide a mechanism of the above mentioned type for preventing retrograde movement, and means associated with said mechanism for manually bringing the same into operative position and for manually releasing the same after once having been brought into said operative position.

A further object of this invention is to provide a mechanism of the above mentioned type which mechanism is normally inoperative, but which may be manually brought into operative position, in which position it will be self-retained until manually released, the said manual actuating means for said mechanism being through the usual brake operating mechanism of the vehicle.

A further object of this invention is to provide a mechanism of the above mentioned type for preventing retrograde movement, said mechanism being frictionally and yieldingly connected with the usual brake operating mechanism of the vehicle, and by means of which connection the mechanism may be manually actuated both for bringing the device into operative position and for releasing the same from its operative position when it is desired to move the vehicle in a direction opposite to that for which it is set to move.

A further object of this invention is to provide a mechanism of the character described for preventing retrograde movement, which mechanism is adjustably connected to the usual brake operating mechanism of a vehicle, by means of which the same may be adjusted to be either automatic or non-automatic in its operation, and when the adjustment is such as to make it non-automatic the mechanism may be brought into operation at any desired time by actuation of the brake operating mechanism to which it is connected.

A further object of this invention is to provide in an automobile of the character described having the usual brake mechanism, of means associated with said brake mechanism for holding the latter in locked position after once having been moved into said position by the actuation of the usual brake operating means, from which position it will be automatically released upon the movement of the car in the direction for which it is set to move.

A further object of this invention is to provide a mechanism of the above mentioned type for preventing retrograde movement which mechanism will be normally inoperative, but which may be brought into operative position by the emergency brake lever or foot brake, and which will act to place the transmission mechanism of the vehicle in such condition upon stopping as to prevent positively any undesired retrograde movement of the vehicle to which it is applied, and which when it is desired to reverse the motion of the vehicle may be placed in position by the actuation of the brake lever or foot brake where such may be accomplished as readily as if the car were not equipped with such mechanism.

A further object of this invention is to provide an automatic brake release mechanism for automobiles and the like.

A further object of this invention is to provide a mechanism of the above mentioned type for preventing retrograde movement, said mechanism being capable of disposition on the cluster shaft or idler gear shaft of the transmission, whereby it will be effective in all positions of the transmission.

A further object of this invention is to provide a mechanism of the above mentioned type, which will be simple in construction, assembly and operation, which may be readily installed in place on an automobile of standard construction without modifying or altering the construction of the same, which may be produced along lines convenient for low cost manufacture, and which will be highly efficient for carrying out the purposes for which it is designed.

With the foregoing and other objects in view, which will appear as the description proceeds, the invention consists in certain novel features of construction, arrangement and combination of parts, hereinafter more fully described, illustrated in the accompanying drawings and particularly pointed out in the appended claims, it being understood that various changes in the form, proportion, size and minor details of the structure may be made without departing from the spirit or sacrificing any of the advantages of the invention. Cross reference is made to my copending application Serial No. 686,397, filed August 23, 1933, which contains claims generic to the subject matter of invention herein disclosed.

For the purpose of facilitating an understanding of my invention, I have illustrated in the accompanying drawings a preferred embodiment thereof, from an inspection of which, when considered in connection with the following description, my invention, its mode of construction, assembly and operation and many of its advantages should be readily understood and appreciated.

Referring to the drawings in which the same characters of reference are employed to indicate corresponding or similar parts throughout the several figures of the drawings:

Figure 1 is a fragmentary sectional view of an automobile showing my improved device incorporated therein;

Figure 2 is a sectional view taken on line 2—2 of Figure 1;

Figure 3 is a modified form of the uni-directional clutch used with my improved device; and Figure 4 is an enlarged fragmentary section substantially taken on line 4—4 of Figure 3.

Figs. 5, 6, 7 and 8 are diagrammatic views of various braking systems embodying the features of the invention and, respectively, illustrate systems of the mechanical, pressure fluid, booster, and vacuum types.

Referring to the drawings more specifically by characters of reference, the numeral 1 designates the usual transmission case of an automobile in which is mounted the usual counter shaft 2, upon which is carried the usual counter shaft cluster gear 3, which cluster gear is adapted for rotary movement around said shaft. The reference character 4 designates the usual roller bearings disposed between the shaft and cluster gear. As all of the above mentioned parts are of standard and well known construction it is not believed necessary to describe the same in more detail.

The mechanism which forms the basis of my present invention comprises the uni-directional clutch 5, which is disposed between the shaft 2 and the cluster gear 3 so as to prevent the relative rotation of the cluster gear in a direction reverse to their normally set turning movement. This uni-directional clutch may be of any desired and well known construction and preferably is of a size which permits its disposition in the space provided between the shaft 2 and the cluster gear 3. In the embodiment illustrated said device consists of a raceway 6, which may be permanently fastened to the inner periphery of the cluster gear, said raceway having provided therein a plurality of grooves 7, having shoulders 8 and inclined floors 9. Each of said grooves has disposed therein a roller 10 of any suitable material such as steel or the like.

The counter shaft 2 is modified to the extent that it is rotatably supported and on one end thereof is provided a cone faced enlargement 11, upon which is carried a lever 12. A suitable nut 13 engages the end of the shaft beyond the cone faced enlargement and is adapted to force the lever 12 up on said cone faced enlargement for adjustably securing the lever and shaft together with varying degrees of rigidity. From an inspection of Figure 1 it will be apparent that by actuating the nut 13 the frictional connection between the portion 11 of the shaft 2 and the lever 12 may be readily adjusted to any desired amount, whereby a yielding connection of the desired amount may be obtained.

Thus, by securely tightening the nut 13 the connection between the counter shaft 2 and lever 12 may be substantially rigid, whereas by loosening said nut 13 the connection may be varied to permit desired amounts of slippage between said shaft and lever 12.

Attached to the upper end of the lever 12, as shown in Figure 1, is a rod 14 which rod connects the lever to the usual service or emergency brake operating mechanism of the automobile through an appropriate linkage for changing the direction of motion as required. Where fluid controlled braking mechanism, such as air or vacuum brakes, are used the rod 14 may be connected to the valve by means of which the brake mechanism is operated and controlled.

Fig. 5 represents diagrammatically the manner in which the present invention may be connected in a mechanical braking system. The rod 14 connects with the lever 30 which, in turn, is pivotally connected with a brake rod 31 which extends to and is connected with a manipulable foot lever 32. A brake rod 31ª is pivotally connected to the lever 30 and to an actuating element 33 of the brake mechanism 34. The rods 31 and 31ª constitute an operating connection between the foot lever 32 and the actuating element 33 upon which the holding force of the connection between the shaft 2 and lever 12 is exerted. A return spring 35 is associated with the foot lever 32 and a similarly acting spring 35ᵃ is connected with the brake mechanism for normally effecting a release of the brake mechanism and in the present device these springs will effect such a release when the holding connection between the shaft 2 and lever 12 is interrupted.

In Fig. 6 the part relationships are substantially the same except that the lever 30 is the operator for a valve 36 by which a source of pressure fluid 37, such as compressed air, is connected with a conduit 38 which leads to the operating mechanism of appropriate fluid pressure actuated braking devices (not shown).

In the modification shown in Fig. 7 the rod 14 is a part of the brake rod 31 and this rod controls a valve mechanism 39 which is interposed in a pressure fluid line 40 leading to a booster type of piston 41ᵃ and cylinder 41 device. The piston and the brake rods 31 and 31ᵃ are, in this structure, connected with the lever 30.

Fig. 8 illustrates a modified form of braking system which is similar to that shown in Fig. 7 except that the conduit 40 is connected with a source of reduced pressure and the piston and cylinder device is correspondingly connected with the conduit 40. In each of these modified forms, it will be evident that the friction connection between the lever 12 and shaft 2 will exert a holding force through the various connecting linkages on the brake mechanism, springs 35 and 35ᵃ being effective to return the parts to their normal idle position upon release of such holding force.

From the above it will be apparent that during the normal rotation of the cluster gear 3, or during the normal travel of the automobile in the direction for which it is set to move, the shoulders 8 of the grooves will push the rollers 10 around the shaft freely in the direction of the arrow "A" of Figure 2. It will be obvious that when moving in this direction there will be no locking action between the shaft 2 and the raceway 6, which is connected rigidly to the cluster gear 3. Now, should the gears 3 commence to revolve in the reverse to their normal direction or clockwise, due to the automobile accidentally moving oppositely to its given direction, the inclined floor 9 of the grooves will move the rollers so they will wedge themselves against the shaft 2, thereby locking the housing or cluster gear 3 and shaft together and cause the shaft partially to revolve with the cluster gear 3. This motion of the shaft may or may not be transmitted to the lever 12, depending upon the frictional connection between the shaft and the lever. Thus when the connection between the shaft and the lever is sufficiently tight or substantially rigid the motion of the shaft will immediately operate the lever 12, thereby actuating the brake operating mechanism of the car with which this lever 12 is connected, which brake operating mechanism will in turn actuate the brakes to bring the car to a stop.

In this position the car will be locked until it is desired to move the car. The transmission gears being in mesh to drive the car in one direction or the other, engagement of the clutch will cause the gears, and particularly the cluster gears, to move in their normal direction (counterclockwise in Fig. 2) thereby releasing the locked condition of the transmission. The instant that this release is accomplished the usual spring mechanism 35 (Figs. 5, 6, 7 and 8) of the brake operating system of the vehicle functions to release the brake mechanism from its braking position and return the parts to their original or idle position. Thus, it will be noted that with the connection between the shaft 2 and lever 12 being substantially rigid, the operation of the retrograde movement device will be substantially automatic. By substantially rigid is meant a degree of rigidity which will cause the brakes to be applied when the shaft is rotated. While this connection may be absolutely fixed, such a condition will tend to set the brakes with undesirable speed and force causing instant stopping of the vehicle and undue strain on the parts. It is preferred, therefore, that the connection be somewhat yielding so that the braking action will be gradual rather than instant.

The preferred adjustment and association of elements, however, is one in which the action of the retrograde movement preventing mechanism is semi-automatic. That is to say, the mechanism does not function automatically to brake the vehicle but the release thereof is automatic in response to certain predetermined movements of the transmission mechanism.

Describing the adjustments and operation of the mechanism in its semi-automatic condition, the locking means functions as has been described to lock the cluster gear 3 and shaft 2 together for conjoint rotation when the cluster gear revolves in a direction which is contrary to normal (clockwise in Fig. 2). The frictional connection between the shaft 2 and lever 12 is, however, adjusted to be considerably looser than in the automatic condition of the device. The preferred adjustment is such that upon initial rotation of the shaft with the cluster gear the lever moves with the shaft in a brake applying direction. This movement does not set the brakes as in the case of the fully automatic adjustment but continues only until the first engagement between the braking surfaces occurs when increased resistance to movement of the lever 12 overcomes the frictional connections and causes the lever to slip relative to the shaft. Hence, the mechanism does not initially have any noticeable effect upon vehicle operation.

Should the operator now apply the brakes in the usual manner to check and stop retrograde movement of the vehicle, his actuation of the braking mechanism imparts a push through the connecting rod 14 to the lever 12 which swings the lever in the same direction as that in which it is moved by the locked shaft and cluster gear. Such movement may of course advance the shaft 2 momentarily interrupting its locked relation with the cluster gear but such relationship will be immediately reestablished when movement of the lever and shaft ceases.

The operator's manipulation of the brake mechanism has thus positioned the lever at a point beyond that to which it was moved by the rotation of the shaft and cluster gear, and at this point the lever and its associated parts will hold the braking mechanism in brake applying condition when the operator discontinues his actuation of the brake mechanism. The frictional connection between the lever and shaft must therefore be amply yielding to prevent application of the brakes by rotation of the shaft and cluster gear, yet must be sufficiently firm to hold the brakes once they have been set and the momentum of the car checked. It will be evident, therefore, that the frictional connection may be adjusted to limit the maximum force which may be applied to maintain the brakes in holding condition. The extreme limit of looseness in the connection between the shaft and lever, which in some instances is the most desirable operating condition, is a frictional connection which will not of itself stop the vehicle as long as it is moving but will exert ample force to hold the vehicle against movement once the vehicle has been brought to rest by the application of the brakes in the usual manner. In operation, therefore, the manipulation of the brakes by the operator in bringing the car to a stop will set the present holding mechanism to an operative position, after which the operator may remove his foot from the foot lever or otherwise discontinue his application of the brakes and the holding mechanism will maintain the brakes in applied condition with ample force to prevent retrograde movement of the vehicle even though the vehicle has been stopped on a relatively steep slope.

It will be evident from the foregoing that the device itself will not check retrograde movement but is actuated to hold the vehicle as an incident to the usual manipulations of the operator in checking such movement. While the transmission mechanism of the vehicle is engaged, the clutch means disengaged and the motor running, or while the transmission mechanism is in neutral, the clutch means engaged and the motor stopped, the present device will operate to prevent retrograde movement.

In order to release the device from its holding position it is only necessary for the operator to engage the clutch means, which of course causes a normal rotation of the transmission mechanism or, as herein illustrated, a counter clockwise rotation of the cluster gear. Automatically in response to this transmission movement, the clutch lock between the cluster gear and shaft 2 is broken, the usual springs associated with the brake mechanism release the brakes and the vehicle is free to move. It may be noted that the normal movement of the cluster gear will, through the shaft, lever and rod, tend to return the brake mechanism to its inoperative position.

Under some circumstances it may become necessary to shift the transmission gears while the retrograde device is holding the vehicle. Obviously the weight of the vehicle, which is then imposed on the gears, makes the shifting operation impossible or at least extremely difficult. With the present device it is only necessary for the operator to set the brakes somewhat more firmly. This manipulation pushes the rod 14 and through the lever 12 rotates the shaft 2 in a releasing direction, or clockwise as seen in Fig. 2, thus relieving the holding effect of the device. The vehicle is now held by the manually applied brakes and the transmission gears may be shifted in the customary manner. Subsequent release of the braking mechanism by the operator will again establish the held condition of the brakes or the vehicle may be started from this position of the parts by the usual manipulations.

Thus, it will be evident that I have provided means which is associated with the transmission mechanism for holding the brake mechanism in operative position after the operator has set the brake mechanism, which means is automatically released upon normal movement of the transmission mechanism to move the vehicle in a desired direction and which may be released by further operation of the brake mechanism.

In the modification shown in Figures 3 and 4, a modified form of uni-directional clutch is shown. However, the connections from the shaft outwardly to the brake system remain unchanged. In this embodiment the numeral 15 designates a set of eccentric rollers mounted on rings 16, which are carried on the shaft 2 and held in spaced position by the rods 17. The numeral 18 designates a journal on each end of the rollers which fits in the bearings 19 of the rings. Surrounding each of the journals is a torsion spring 20, one end of which spring is adapted to be received in an opening 21 provided therefor in the eccentric roller, and the opposite end of which is adapted to bear against the shaft 2 as more clearly illustrated in Figure 4 of the drawings. The function of each spring is to effect a more positive operation of its associated roller for locking the gear 3 to the shaft 2 when the former rotates in a direction contrary to its normal direction of rotation. This form of roller and its operation is more clearly illustrated and disclosed in my co-pending applications, Serial No. 572,849 filed November 3, 1931, and Serial No. 584,457 filed January 2, 1932. By reason of the disclosures made in the above mentioned applications it is not believed necessary to describe the same in more detail herein.

The present embodiment of the invention has been described in association with the cluster gear of a transmission mechanism, this gear having been chosen as representative and illustrative of a gear which in the normal operation of the mechanism travels only in one direction irrespective of the direction in which the vehicle is being driven.

It will be understood that the adjustable connection between the shaft 2 and the lever 12 is only one of various forms of connections which might be used for frictionally connecting the two together, whereby when the proper adjustment is made in said connection the retrograde mechanism will be inoperative for preventing retrograde movement until the manual application of the brake mechanism by the operator. However, when once applied, the device will be effective for inhibiting any further retrograde movement. The important feature of the invention is, therefore, the provision of means whereby the operation of the retrograde movement device will be under the direct control of the operator and when once brought into operative position will bring the car to rest by the gradual absorption and dissipation of energy and consequently there will be no jamming of the parts requiring great force to put the parts into movement again and at the time avoids the sudden jar to the transmission gear and all of the parts associated therewith which would be occasioned by the use of ratchet or similar mechanism, which when brought into operation would cause the car to stop instantly.

Attention is also directed to the fact that once having been brought into operative position the mechanism may be readily released by the mere application of pressure on the brake operating mechanism to which the lever 12 is connected, thus permitting the ready movement in any direction of a vehicle which has been parked with the mechanism in operative position.

It will also be understood that the particular forms of uni-directional clutches are merely illustrated by way of example and may assume widely different forms without departing from the spirit of my invention.

It is believed that my invention, its mode of construction, assembly and operation, and many of its advantages should be readily understood from the foregoing without further description, and should also be manifest that while a preferred embodiment of the invention has been shown and described for illustrative purposes, the structural details are, nevertheless, capable of wide variation within the purview of my invention as defined in the appended claims.

What I claim and desire to secure by Letters Patent of the United States is:

1. A vehicle transmission including a gear, and a rotating shaft upon which said gear is mounted, and comprising, in combination therewith, a uni-directional clutch disposed between said gear and shaft for preventing relative rotation of the gear with respect to the shaft in one direction, a brake system having operating mechanism controlling said system, and adjustable means for yieldingly connecting said shaft to the brake operating mechanism of the vehicle.

2. In a vehicle having a brake system including operating mechanism, a vehicle transmission including change speed gears, at least one of which normally rotates in the same direction, whichever direction the vehicle is moving, a rotating shaft upon which said one gear is mounted, the combination of a uni-directional clutch disposed between said one gear and shaft for locking said one gear to its shaft when rotating in the opposite direction, and means for yieldingly connecting said shaft to the brake operating mechanism of the vehicle.

3. In a vehicle having a brake system including operating mechanism, a vehicle transmission including change speed gears, and a shaft upon which said change speed gears are mounted, the combination of a uni-directional clutch disposed between said gears and shaft for automatically locking said gears to its shaft when rotating in one direction, and means for yieldingly connecting said shaft to the brake operating mechanism of the vehicle.

4. In a vehicle having a brake system including operating mechanism, a vehicle transmission including change speed gears, and a shaft upon which said change speed gears are mounted, the combination of locking means disposed between said shaft and gears for automatically locking the same together when rotating in one direction, said locking means being inoperative so long as the gear is turning in the opposite direction, and means yieldably connecting said shaft to the brake operating mechanism of the vehicle.

5. In a vehicle having a brake system including operating mechanism, a vehicle transmission including change speed gears, and a shaft upon which said gears are mounted, the combination of locking means for automatically locking said gears and shaft when rotating in one direction, said locking means being inoperative when the gear is rotating in the opposite direction, and adjustable means for frictionally and yieldingly connecting said shaft to the brake operating mechanism of the vehicle.

6. A vehicle having a brake, operating mechanism therefor, a transmission including a gear, and a shaft upon which said gear is mounted, the combination therewith of a locking means disposed between said gear and shaft for automatically locking the two together when rotating in one direction, and means for frictionally connecting said shaft to the brake operating mechanism of the vehicle, said frictional connection being insufficient for checking previously acquired retrograde movement of the vehicle, but being sufficient to hold the vehicle on any ordinary incline.

7. A vehicle having a brake, operating mechanism therefor, a transmission including a gear rotating in the same direction, whichever direction the vehicle is moving, and a shaft upon which said gear is mounted, the combination therewith of a locking means arranged to lock said shaft and gear to each other when rotating in one direction, and means for adjustably yieldingly connecting said shaft to the brake operating mechanism of the vehicle, whereby the rotation of said shaft will operate said brake mechanism, said locking means being automatically released upon movement of the gear in its normal direction, the release of said locking mechanism being effective for automatically releasing said brake mechanism.

8. A vehicle transmission comprising in combination a rotatable member turning in the same direction, in either direction of vehicle movement, a rotatable shaft upon which said rotatable member is mounted, locking means disposed between said shaft and rotatable member for locking the two together upon rotation of said member in the opposite direction, a brake having operating mechanism associated therewith, and yieldable means connecting said shaft with the brake operating mechanism whereby the actuation of the brake operating mechanism will be effective for bringing the locking mechanism into operative position.

9. A vehicle transmission comprising in combination a rotatable member turning in the same direction, in either direction of vehicle movement, a rotatable shaft upon which said rotatable member is mounted, locking means disposed between said shaft and rotatable member for locking the two together upon rotation of said member in the opposite direction, a brake having operating mechanism associated therewith, and yieldable means connecting said shaft with the brake operating mechanism whereby the actuation of the brake operating mechanism will be effective for bringing the locking mechanism into operative position, said locking mechanism being automatically released upon the rotation of the member in its normal direction.

10. A vehicle transmission comprising in combination a rotatable member, and a shaft upon which said member is mounted for rotation, locking means interposed between said shaft and member for locking the same to each other when said member is rotating in one direction, a brake having operating mechanism associated therewith, and means connecting said shaft with the brake operating mechanism, whereby the actuation of the latter when the locking means is in inoperative position will effect a locking of said shaft and member to each other, and when said locking means is in operative position the actuation of the brake operating mechanism will effect a movement of said locked member and shaft.

11. A vehicle transmission including a gear rotating in the same direction, whichever direction the vehicle is moving, and a shaft upon which said gear is mounted and comprising, in combination therewith, a locking means for locking said shaft and gear to each other when the latter rotates in the opposite direction, a brake having operating mechanism associated therewith, and means connecting said shaft to the brake operating mechanism, said locking means being effective for holding the brake mechanism in operative position after said brake mechanism had been moved to such position by the operator, and for automatically releasing said braking mechanism upon movement of the vehicle in the direction for which it is set to move.

12. A vehicle transmission including change speed gears, at least one of which normally rotates in the same direction, whichever direction the vehicle is moving, a rotatable shaft upon which said one gear is mounted, and comprising, in combination therewith, a locking means for locking said shaft to said one gear when the latter rotates in the opposite direction, a brake having operating mechanism associated therewith, and means for frictionally connecting said shaft to the brake operating mechanism whereby the operation of said brake operating mechanism in the usual manner will effect a locking of said gear to its shaft when said gear and shaft are in an unlocked position, and will automatically release said brake mechanism from its operative position when said gear is rotated in its normal direction.

13. In a motor vehicle, the combination with the driving wheels and transmission gears for rotating said wheels so as to propel the vehicle either forward or backward, said gears including at least one that rotates in the same direction, whether the vehicle is propelled by said gearing either forward or backward, a rotatable shaft on which said one gear rotates, and means for automatically locking said gear to said shaft when the former reverses its direction of rotation.

14. In a motor vehicle, the combination of a propeller shaft, a driven element rotating in the same direction, in whichever direction the vehicle is driven, a rotatable shaft upon which said driven element is mounted, and means rendered immediately effective by any reverse rotation of said element for locking said element to said second mentioned shaft.

15. A vehicle transmission comprising, in combination, a rotating supporting shaft, a change speed gear member rotatably mounted on said shaft, means interposed between said shaft and said member for locking the same together upon rotation of said member in one direction, a vehicle brake operating mechanism, and means yieldingly connecting said shaft to the brake operating mechanism of the vehicle.

16. In a motor vehicle having a brake mechanism and a transmission mechanism, the combination therewith of means associated with said transmission mechanism for holding the brake mechanism in operative position after the said brake mechanism has been moved to such position by the operator, said means being automatically released upon movement of the car in the direction for which it is set to move.

17. In a motor vehicle having a brake mechanism and transmission gears, and means associated with said transmission gears and yieldably connected to said brake operating mechanism for automatically releasing the latter from operative position when the vehicle moves in the direction for which it is set to move.

18. In a motor vehicle, the combination with the driving wheels and transmission gears for rotating said wheels so as to propel the vehicle either forward or backward, said gears including at least one that rotates in the same direction, whether the vehicle is propelled by said gearing either forward or backward, a rotatable shaft on which said one gear rotates, a one-way clutch device interposed between said gear and its shaft for locking the same to each other when said gear rotates in a reverse direction, a vehicle brake operating mechanism, and means for connecting said shaft to the brake operating mechanism, said last mentioned means permitting the manual operation and release of the one-way clutch device through the brake operating mechanism.

19. A vehicle transmission including change speed gears and means for shifting said gears, said change speed gears including at least one which normally rotates in the same direction, whichever direction the vehicle is moving, a shaft upon which said one gear is mounted, and comprising in combination therewith, locking means interposed between said shaft and said one gear for locking the same to each other when said shaft is rotated in one direction, vehicle brake operating mechanism and means connecting said shaft with the brake operating mechanism of the vehicle whereby the actuation of the brake operating mechanism when the locking means is in inoperative position, will effect a locking of said shaft and member to each other, and when said locking means is in operative position the actuation of the brake operating mechanism will effect a movement of said locked one gear and shaft for facilitating in the shifting of said change speed gears.

20. In a motor vehicle having brake mechanism and transmission gears, the combination of means including a rotatable shaft adapted for locking engagement with at least one of said transmission gears when the latter is moved in one direction, brake mechanism and means connecting said rotatable shaft to said brake mechanism so that the actuation of the latter will effect a locking means between said shaft and said one gear, said last mentioned means being effective for automatically releasing said brake mechanism from its operative position when the vehicle is moved in the direction for which it is set to move.

21. In a motor vehicle having brake operating mechanism and transmission mechanism, the combination of means associated with said transmission mechanism for preventing retrograde movement of the vehicle, said last mentioned means being connected to the brake operating mechanism and being so constructed as to be operative only upon the actuation of said brake operating mechanism, but when once brought to an operative position by the actuation of said brake operating mechanism it will remain in such position until movement of the car in the direction for which it is set to move, which movement will automatically release the said locking means.

22. A vehicle transmission mechanism adapted to be driven by an engine and including a gear rotating in the same direction, whichever direction the vehicle is moving when driven by the engine, and a rotatable shaft upon which said gear is mounted, and comprising, in combination therewith, a unidirectional clutch disposed between said gear and shaft for locking said gear and shaft together when the gear is rotated in the opposite direction, a brake system including operating mechanism therefor, and means for connecting said shaft to the brake operating mechanism of the vehicle, said connecting means permitting a predetermined amount of slippage between said shaft and said brake operating mechanism.

MAX LEICHSENRING, JR.